(12) United States Patent
McCloghrie et al.

(10) Patent No.: US 6,920,112 B1
(45) Date of Patent: Jul. 19, 2005

(54) SAMPLING PACKETS FOR NETWORK MONITORING

(75) Inventors: Keith McCloghrie, San Jose, CA (US); Stephan Robert, Neuchatel (CH); Jean Walrand, Berkeley, CA (US); Andrew Bierman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/106,519

(22) Filed: Jun. 29, 1998

(51) Int. Cl.[7] ............................................... G01R 31/08
(52) U.S. Cl. ...................... 370/252; 370/230; 370/235; 710/33
(58) Field of Search ................................ 370/252, 253, 370/230, 231, 232, 392, 412, 428, 429, 474, 477; 710/33, 34

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,500,990 A * | 2/1985 | Akashi ........................ 370/235 |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. ................... 370/60 |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |

(Continued)

*Primary Examiner*—Bob A. Phunkulh
(74) *Attorney, Agent, or Firm*—Hickman Palermo Truong & Becker LLP

(57) ABSTRACT

The invention provides a method and system for collecting aggregate information about network traffic, while maintaining processor load relatively constant despite substantial variation in network traffic, and capable of substantially accurate frequency measurement even for relatively infrequent events. A packet monitoring system includes an input port for receiving network packets, a sampling element for selecting a fraction of those packets for review, and a queue of selected packets. The packets in the queue are coupled to a packet-type detector for detecting packets of a selected type; the system applies a measurement technique for determining a frequency measure for those detected packets. The system includes a feedback technique for adaptively altering the sampling rate fraction, responsive to the queue length and possibly other factors, such as processor load or the detected frequency measure. The measurement technique also determines an error range and a measure of confidence that the actual frequency is within the error range of the measured frequency. The system can detect packets of multiple selected types essentially simultaneously, and provide measured frequencies and error ranges for all of the multiple selected types at once. Also, the measurement technique is selected so as to impose relatively light processor load per packet.

38 Claims, 2 Drawing Sheets

U.S. PATENT DOCUMENTS

| | | | |
|---|---|---|---|
| 4,769,810 A | 9/1988 | Eckberg, Jr. et al. | |
| 4,769,811 A | 9/1988 | Eckberg, Jr. et al. | |
| 4,771,425 A | 9/1988 | Baran et al. | |
| 4,819,228 A | 4/1989 | Baran et al. | |
| 4,827,411 A | 5/1989 | Arrowood et al. | |
| 4,833,706 A | 5/1989 | Hughes-Hartogs | |
| 4,835,737 A | 5/1989 | Herrig et al. | |
| 4,879,551 A | 11/1989 | Georgiou et al. | |
| 4,893,306 A | 1/1990 | Chao et al. | |
| 4,903,261 A | 2/1990 | Baran et al. | |
| 4,905,233 A | 2/1990 | Cain et al. | |
| 4,922,486 A | 5/1990 | Lidinsky et al. | |
| 4,933,937 A | 6/1990 | Konishi | |
| 4,960,310 A | 10/1990 | Cushing | |
| 4,962,497 A | 10/1990 | Ferenc et al. | |
| 4,962,532 A | 10/1990 | Kasiraj et al. | |
| 4,965,772 A | 10/1990 | Daniel et al. | |
| 4,970,678 A | 11/1990 | Sladowski et al. | |
| 4,979,118 A | 12/1990 | Kheradpir | 364/436 |
| 4,980,897 A | 12/1990 | Decker et al. | |
| 4,991,169 A | 2/1991 | Davis et al. | |
| 5,003,595 A | 3/1991 | Collins et al. | |
| 5,014,265 A | 5/1991 | Hahne et al. | |
| 5,020,058 A | 5/1991 | Holden et al. | |
| 5,033,076 A | 7/1991 | Jones et al. | |
| 5,054,034 A | 10/1991 | Hughes-Hartogs | |
| 5,059,925 A | 10/1991 | Weisbloom | |
| 5,072,449 A | 12/1991 | Enns et al. | |
| 5,088,032 A | 2/1992 | Bosack | |
| 5,095,480 A | 3/1992 | Fenner | 370/94.1 |
| RE33,900 E | 4/1992 | Howson | |
| 5,115,431 A | 5/1992 | Williams et al. | |
| 5,115,495 A | 5/1992 | Tsuchiya et al. | |
| 5,128,926 A | 7/1992 | Perlman et al. | |
| 5,128,945 A | 7/1992 | Enns et al. | |
| 5,136,580 A | 8/1992 | Videlock et al. | |
| 5,166,930 A | 11/1992 | Braff et al. | |
| 5,189,662 A | 2/1993 | Kleine-Altekamp | |
| 5,199,049 A | 3/1993 | Wilson | |
| 5,206,886 A | 4/1993 | Bingham | |
| 5,208,811 A | 5/1993 | Kashio et al. | |
| 5,212,686 A | 5/1993 | Joy et al. | |
| 5,224,099 A | 6/1993 | Corbalis et al. | |
| 5,226,120 A | 7/1993 | Brown et al. | |
| 5,228,062 A | 7/1993 | Bingham | |
| 5,229,994 A | 7/1993 | Balzano et al. | |
| 5,233,604 A | 8/1993 | Ahmadi et al. | |
| 5,237,564 A | 8/1993 | Lespagnol et al. | |
| 5,241,682 A | 8/1993 | Bryant et al. | |
| 5,243,342 A | 9/1993 | Kattemalalavadi et al. | |
| 5,243,596 A | 9/1993 | Port et al. | |
| 5,247,516 A | 9/1993 | Bernstein et al. | |
| 5,249,178 A | 9/1993 | Kurano et al. | |
| 5,253,251 A | 10/1993 | Aramaki | |
| 5,255,291 A | 10/1993 | Holden et al. | |
| 5,260,933 A | 11/1993 | Rouse | |
| 5,260,978 A | 11/1993 | Fleischer et al. | |
| 5,268,592 A | 12/1993 | Bellamy et al. | |
| 5,268,900 A | 12/1993 | Hluchyj et al. | |
| 5,271,004 A | 12/1993 | Proctor et al. | |
| 5,274,631 A | 12/1993 | Bhardwaj | |
| 5,274,635 A | 12/1993 | Rahman et al. | |
| 5,274,643 A | 12/1993 | Fisk | |
| 5,280,470 A | 1/1994 | Buhrke et al. | |
| 5,280,480 A | 1/1994 | Pitt et al. | |
| 5,280,500 A | 1/1994 | Mazzola et al. | |
| 5,283,783 A | 2/1994 | Nguyen et al. | |
| 5,287,103 A | 2/1994 | Kasprzyk et al. | |
| 5,287,453 A | 2/1994 | Roberts | 395/200 |
| 5,291,482 A | 3/1994 | McHarg et al. | |
| 5,305,311 A | 4/1994 | Lyles | |
| 5,307,343 A | 4/1994 | Bostica et al. | |
| 5,309,437 A | 5/1994 | Perlman et al. | 730/85.13 |
| 5,311,509 A | 5/1994 | Heddes et al. | |
| 5,313,454 A | 5/1994 | Bustini et al. | |
| 5,313,582 A | 5/1994 | Hendel et al. | |
| 5,315,580 A * | 5/1994 | Phaal | 370/232 |
| 5,317,562 A | 5/1994 | Nardin et al. | |
| 5,319,644 A | 6/1994 | Liang | |
| 5,325,358 A | 6/1994 | Goeldner | |
| 5,325,504 A | 6/1994 | Tipley et al. | |
| 5,327,421 A | 7/1994 | Hiller et al. | |
| 5,331,637 A | 7/1994 | Francis et al. | |
| 5,335,224 A | 8/1994 | Cole et al. | |
| 5,345,445 A | 9/1994 | Hiller et al. | |
| 5,345,446 A | 9/1994 | Hiller et al. | |
| 5,359,592 A | 10/1994 | Corbalis et al. | |
| 5,361,250 A | 11/1994 | Nguyen et al. | |
| 5,361,256 A | 11/1994 | Doeringer et al. | |
| 5,361,259 A | 11/1994 | Hunt et al. | |
| 5,365,524 A | 11/1994 | Hiller et al. | |
| 5,367,517 A | 11/1994 | Cidon et al. | |
| 5,371,852 A | 12/1994 | Attanasio et al. | |
| 5,386,567 A | 1/1995 | Lien et al. | |
| 5,390,170 A | 2/1995 | Sawant et al. | |
| 5,390,175 A | 2/1995 | Hiller et al. | |
| 5,394,394 A | 2/1995 | Crowther et al. | |
| 5,394,402 A | 2/1995 | Ross | |
| 5,394,408 A | 2/1995 | Nishihara et al. | |
| 5,400,325 A | 3/1995 | Chatwani et al. | |
| 5,408,469 A | 4/1995 | Opher et al. | |
| 5,416,842 A | 5/1995 | Aziz | |
| 5,422,880 A | 6/1995 | Heitkamp et al. | |
| 5,422,882 A | 6/1995 | Hiller et al. | |
| 5,423,002 A | 6/1995 | Hart | |
| 5,426,636 A | 6/1995 | Hiller et al. | |
| 5,428,607 A | 6/1995 | Hiller et al. | |
| 5,430,715 A | 7/1995 | Corbalis et al. | |
| 5,430,729 A | 7/1995 | Rahnema | |
| 5,432,784 A | 7/1995 | Ozveren | |
| 5,436,886 A | 7/1995 | McGill | |
| 5,442,457 A | 8/1995 | Najafi | |
| 5,442,630 A | 8/1995 | Gagliardi et al. | |
| 5,448,559 A | 9/1995 | Hayter et al. | |
| 5,452,294 A | 9/1995 | Natarajan | |
| 5,452,297 A | 9/1995 | Hiller et al. | |
| 5,473,599 A | 12/1995 | Li et al. | |
| 5,473,607 A | 12/1995 | Hausman et al. | |
| 5,477,541 A | 12/1995 | White et al. | |
| 5,485,455 A | 1/1996 | Dobbins et al. | |
| 5,490,140 A | 2/1996 | Abensour et al. | |
| 5,490,258 A | 2/1996 | Fenner | 395/401 |
| 5,491,687 A | 2/1996 | Christensen et al. | |
| 5,491,804 A | 2/1996 | Heath et al. | |
| 5,497,368 A | 3/1996 | Reijnierse et al. | |
| 5,504,747 A | 4/1996 | Sweasey | |
| 5,509,006 A | 4/1996 | Wilford et al. | |
| 5,517,494 A | 5/1996 | Green | |
| 5,519,704 A | 5/1996 | Farinacci et al. | |
| 5,519,858 A | 5/1996 | Walton et al. | 395/600 |
| 5,524,254 A | 6/1996 | Morgan et al. | |
| 5,526,489 A | 6/1996 | Nilakantan et al. | |
| 5,530,963 A | 6/1996 | Moore et al. | |
| 5,535,195 A | 7/1996 | Lee | |
| 5,539,734 A | 7/1996 | Burwell et al. | |
| 5,539,737 A | 7/1996 | Lo et al. | |
| 5,541,911 A | 7/1996 | Nilakantan et al. | |
| 5,546,370 A | 8/1996 | Ishikawa | |
| 5,550,816 A | 8/1996 | Hardwick et al. | |
| 5,555,244 A | 9/1996 | Gupta et al. | |
| 5,559,801 A * | 9/1996 | Lo | 370/412 |

| Patent Number | Date | Inventor(s) |
|---|---|---|
| 5,561,669 A | 10/1996 | Lenney et al. |
| 5,583,862 A | 12/1996 | Callon |
| 5,590,122 A | 12/1996 | Sandorfi et al. |
| 5,592,470 A | 1/1997 | Rudrapatna et al. |
| 5,596,723 A | 1/1997 | Romohr |
| 5,598,532 A | 1/1997 | Liron |
| 5,598,581 A | 1/1997 | Daines et al. |
| 5,600,798 A | 2/1997 | Cherukuri et al. |
| 5,604,868 A | 2/1997 | Komine et al. |
| 5,608,726 A | 3/1997 | Virgile |
| 5,608,908 A | 3/1997 | Barghouti et al. |
| 5,613,096 A | 3/1997 | Danknick |
| 5,617,417 A | 4/1997 | Sathe et al. |
| 5,617,421 A | 4/1997 | Chin et al. |
| 5,630,125 A | 5/1997 | Zellweger .................. 395/614 |
| 5,631,908 A | 5/1997 | Saxe |
| 5,632,021 A | 5/1997 | Jennings et al. |
| 5,634,010 A | 5/1997 | Ciscon et al. |
| 5,634,011 A | 5/1997 | Auerbach et al. |
| 5,638,359 A | 6/1997 | Peltola et al. |
| 5,644,713 A | 7/1997 | Makishima |
| 5,644,718 A | 7/1997 | Belove et al. |
| 5,646,959 A * | 7/1997 | Kamishima ................ 375/240 |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A | 11/1997 | Chiussi et al. |
| 5,691,984 A | 11/1997 | Gardner et al. |
| 5,694,390 A | 12/1997 | Yamato et al. |
| 5,724,351 A | 3/1998 | Chao et al. |
| 5,748,186 A | 5/1998 | Raman ...................... 345/302 |
| 5,748,617 A | 5/1998 | McLain, Jr. |
| 5,754,547 A | 5/1998 | Nakazawa |
| 5,761,192 A | 6/1998 | Hummel |
| 5,771,231 A * | 6/1998 | Watanabe .................. 370/377 |
| 5,774,698 A | 6/1998 | Olnowich |
| 5,793,745 A | 8/1998 | Manchester |
| 5,796,736 A | 8/1998 | Suzuki |
| 5,802,042 A | 9/1998 | Natarajan et al. |
| 5,802,054 A | 9/1998 | Bellenger |
| 5,835,710 A | 11/1998 | Nagami et al. |
| 5,854,903 A | 12/1998 | Morrison et al. |
| 5,856,981 A | 1/1999 | Voelker |
| 5,859,837 A | 1/1999 | Crayford |
| 5,892,924 A | 4/1999 | Lyon et al. ............ 395/200.75 |
| 5,898,686 A | 4/1999 | Virgile |
| 5,903,559 A | 5/1999 | Acharya et al. |
| 5,909,440 A | 6/1999 | Ferguson et al. |
| 5,914,953 A | 6/1999 | Krause et al. |
| 5,978,115 A | 11/1999 | Condict et al. |
| 5,996,021 A | 11/1999 | Civanlar et al. |
| 6,011,780 A | 1/2000 | Vaman et al. |
| 6,023,733 A | 2/2000 | Periasamy et al. |
| 6,032,194 A | 2/2000 | Gai et al. |
| 6,041,114 A | 3/2000 | Chestnut |
| 6,111,877 A | 8/2000 | Wilford et al. |
| 6,219,739 B1 | 4/2001 | Dutt et al. |
| 6,229,787 B1 | 5/2001 | Byrne |
| 6,292,466 B1 * | 9/2001 | Droz ......................... 370/232 |

\* cited by examiner

SAMPLING PACKETS FOR NETWORK MONITORING

BACKGROUND OF THE INVENTION

1. Field of the Invention

This invention relates to network monitoring.

2. Related Art

In a computer network in which messages are transmitted and received between devices, it is often desirable to monitor the nature and volume of communication traffic. For example, by noting the number of messages (or more detailed information about those messages) transmitted from selected source devices or to selected destination devices, it can be possible to obtain useful information about usage patterns of the network. One known set of network objects used for this purpose is called RMON ("remote monitoring"). In known systems, a device coupled to and monitoring a communication link in the network generates these RMON objects. RMON objects are retrievable from the generating device using a known message protocol, such as SNMP (Simple Network Message Protocol).

RMON was originally conceived for monitoring OSI layer 1 and layer 2 communication. Accordingly, a first version of RMON (RMON1) was directed to collecting information and statistics primarily about packets between a source device MAC address and a destination device MAC address. A first version of RMON1 was optimized in some respects for Ethernet LAN communication; a second version was optimized for token-ring LAN communication. RMON1 also included capabilities for capturing the contents of selected packets, and for setting alarms upon selected events (those events being distinguished for layer 1 and layer 2 communication).

A more recent version of RMON (RMON2) extends the monitoring capabilities to include more analysis of actual packets, including identifying layer 3, layer 4, and some application aspects of communication. For example, RMON2 includes capabilities for collecting information about usage of particular routing protocols (such as IP or IPX) and particular ports used at the source device or destination device (such as ports for FTP or HTTP transactions). RMON2 also differs from RMON1 in the number of communication links that are monitored by a single device.

In parallel with the evolution from RMON1 to RMON2, another evolution has taken place: early RMON applications using RMON1 were usually directed to monitoring probes, which monitor a single port of a switch. More recent RMON applications using RMON2 are often directed to monitoring software that is embedded in a switch, and therefore is contemplated to monitor several, preferably all, interfaces of the switch.

One problem in the known art is that ability to monitor network traffic is not keeping up with the amount and speed of the network traffic itself. First, more recent versions of RMON result in an increase in the processing required for each packet. Second, it is desirable to monitor as many output interfaces as possible. Third, the bandwidth and wire speed of network interfaces is rapidly increasing due to advances in technology. All three of these effects require additional processing power in the monitoring device.

One response to this problem is to select only a sample set of packets for monitoring, rather than attempting to process all packets transmitted over the monitored communication links. The sampled traffic would serve as a proxy for all traffic, to measure the frequency of selected network events and to collect aggregate information about network traffic. U.S. Pat. No. 5,315,580, titled "Network Monitoring Device and System", issued May 24, 1994, in the name of Peter Phaal, to assignee Hewlett-Packard Company of Palo Alto, Calif. shows one example of a sampling technique for monitoring.

Known sampling techniques achieve the purpose of collecting aggregate information about network traffic where the network transmission rate of packets exceeds the ability of the monitoring device to process those packets. However, these techniques suffer from several drawbacks. First, estimated frequency measurement for relatively in-frequent events can be subject to error and inaccuracy. Second, processor load for the monitoring device can vary wildly in response to network traffic load. When network traffic is relatively frequent, processor load is relatively heavy, and the monitoring device can fail to keep up with the network traffic. When network traffic is relatively infrequent, processor load is relatively light, and the monitoring device can be underused.

Accordingly, it would be advantageous to provide a method and system for collecting aggregate information about network traffic, in which processor load is relatively constant despite substantial variation in network traffic, and in which the accuracy of frequency measurement can be improved even for relatively infrequent events, due to the ability to sample more frequently. This advantage is achieved in an embodiment of the invention that samples packets from network traffic adaptively in response to that network traffic, and measures frequency in response to either the sampling rate or the frequency rate of appearance in sampled packets, or both.

SUMMARY OF THE INVENTION

The invention provides a method and system for collecting aggregate information about network traffic, while maintaining processor load relatively constant despite substantial variation in network traffic, and capable of substantially accurate frequency measurement even for relatively infrequent events. A packet monitoring system includes an input port for receiving network packets, a sampling element for selecting a fraction of those packets for review, and a queue of selected packets. The packets in the queue are coupled to a packet-type detector for detecting packets of a selected type; the system applies a measurement technique for determining a frequency measure for those detected packets. The system includes a feedback technique for adaptively altering the sampling rate fraction, responsive to the queue length and possibly other factors, such as processor load or the detected frequency measure.

In a preferred embodiment, the measurement technique also determines an error range and a measure of confidence that the actual frequency is within the error range of the measured frequency. The system can detect packets of multiple selected types, and provide measured frequencies and error ranges for all of the multiple selected types concurrently. Also, the measurement technique is selected so as to impose relatively little computational load per packet.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

Sampling System Elements

Figure 1:
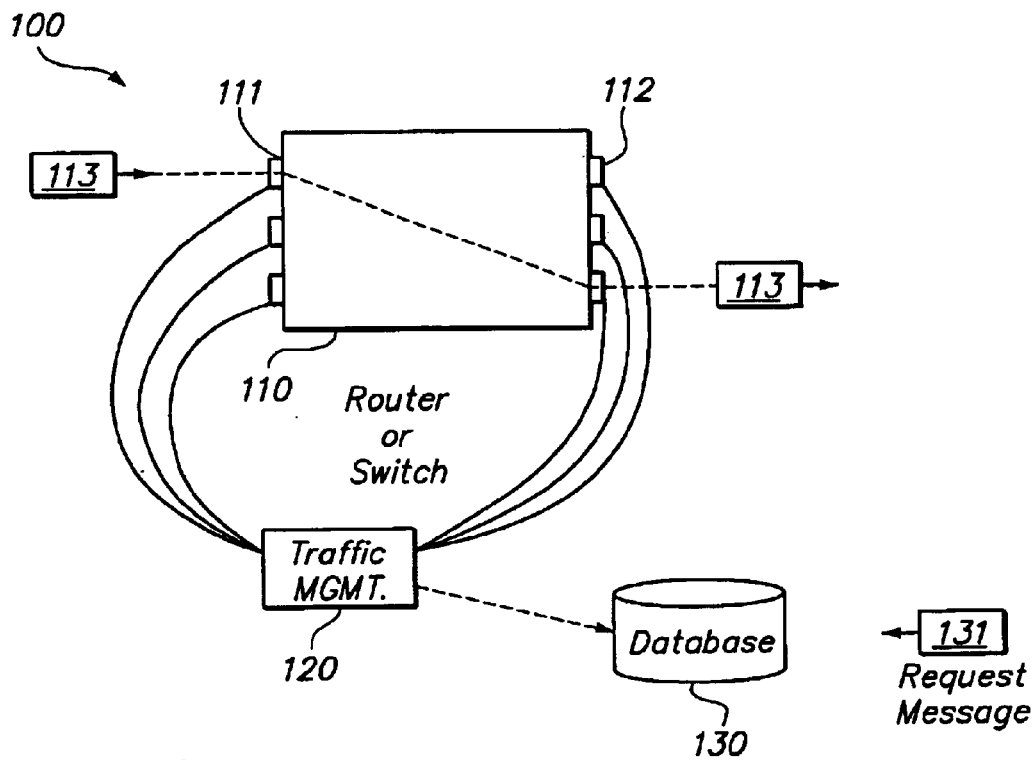
FIG. 1 shows a block diagram of a system for collecting information about packet traffic.

FIG. 1 shows a block diagram of a system for collecting information about packet traffic.

A system 100 for collecting information about packet traffic includes a packet router or packet switch 110, a traffic management element 120, and a traffic information database 130.

The packet switch 110 includes a plurality of input interfaces 111 and output interfaces 112. The packet switch 110 it is disposed to receive a sequence of packets 113 at one or more of those input interfaces 111, and to output those packets 113 (possibly altered according to known packet rewrite rules) at one or more of those output interfaces 112. Packet routers and packet switches 110 are known in the art of computer networks.

The traffic management element 120 is coupled to at least one of the input interfaces 111 or output interfaces 112. (In a the preferred embodiment, the traffic management element 120 is coupled to substantially all of the input interfaces 111 and to substantially all of the output interfaces 112.) The traffic management element 120 is disposed to receive substantially all of the packets 113 input to the packet switch 1 10 and to sample a fraction of those packets 113. Similarly, the traffic management element 120 is also disposed to review substantially all of the packets 113 about to be output from the packet switch 110 and to sample a fraction of those packets 113.

In alternative preferred embodiments, the traffic management element 120 can be distributed within a plurality of devices, such that sampling of packets 113 occurs at the input interfaces 111 or output interfaces 112, while counting and analysis occur at another logical location. In such alternative preferred embodiments, the portion of the traffic management element 120 that actually samples input packets 113 marks each sampled input packet 113 as a sample and forwards those sampled input packets 113 to another portion of the traffic management element 120 for counting and analysis. Similarly, the portion of the traffic management element 120 that actually samples output packets 113 marks each sampled output packet 113 as a sample, and forwards those sampled output packets 113 back to the traffic management element 120. Sampling and forwarding of output packets 113 does not actually output a duplicate packet 113 at the output interface 112.

Since it is advantageous for the traffic management element 120 to perform accurate counting and analysis, each sampled packet 113 (whether a sampled input packet 113 or a sampled output packet 113) thus forwarded is labeled with a sequence number. This allows the portion of the traffic management element 120 performing counting and analysis to avoid losing synchronization even if a sampled packet 113 is dropped after forwarding by the portion of the traffic management element 120 for sampling and forwarding.

The traffic management element 120 is coupled to the traffic information database 130. The traffic management element 120 is disposed to output the information it collects about sampled packets. 113 to the traffic information database 130. The traffic information database 130 is disposed to store that information and to output or present that information in response to a request message 131 from a device coupled to the network (not shown).

In a preferred embodiment, the traffic information database 130 records the information about sampled packets 113 in a known format, such as the RMON MIB format, and the device coupled to the network communicates with the traffic information database 130 using a known protocol such as the SNMP protocol. The RMON MIB format and the SNMP protocol are known in the art of computer networks.

Adaptive Sampling System

Figure 2:
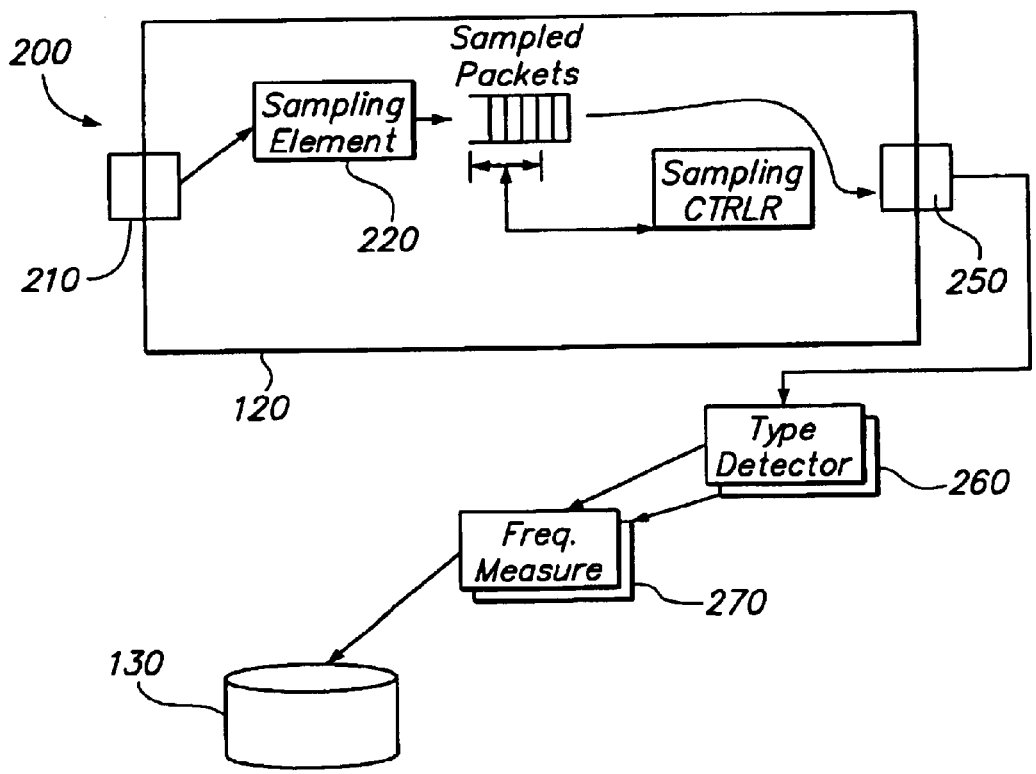
FIG. 2 shows a block diagram of a system for adaptively sampling packets.

FIG. 2 shows a block diagram of a system for adaptively sampling packets.

A system 200 for adaptively sampling packets includes a packet input port 210, a sampling element 220, a sampled packet queue 230, an adaptive sampling controller 240, a sampled-packet output port 250, at least one packet type detector 260, and at least one frequency measure element 270.

The packet input port 210 is disposed within the traffic management element 120, and is disposed to receive substantially all of the packets 113 input to the packet switch 110. In those alternative embodiment where the traffic management element 120 is distributed in both a first portion for sampling and forwarding and a second portion for counting and analysis, the packet input port 210 is disposed within the first portion for sampling and forwarding.

In alternative embodiments, the packet input port 210 may be disposed to receive only a selected subset of the packets 113 input to the packet switch 110, such as only those packets 113 using a selected protocol such as IP or a selected protocol at another layer such as HTTP. In further or other alternative embodiments, the packet input port 210 may be disposed to receive packets 113 output by (rather than input to) the packet switch 110.

The sampling element 220 is coupled to the packet input port 210 and is disposed to sample one out of every N packets 113, where N is a control parameter. The adaptive sampling controller 240 sets the value of N. In a preferred embodiment, the value of N is adjusted to start at a default value, and adaptively adjusted thereafter, as described herein. Thus, one out of every N packets is selected by the sampling clement 220 for further processing by the traffic management element 120. In a preferred embodiment, the default value of N is selected in response to the bandwidth of the packet input port. For example, the default value can be set to 400 for a 1 gigabit-per-second port, 40 for a 100 megabit-per-second port, or 4 for a 10 megabit-per-second port.

The system 200 appends those packets 113 selected by the sampling element 220 to the tail of the sampled packet queue 230. The sampled packet queue 230 is disposed to receive, store, and present packets 113 in a FIFO (first in first out) manner. FIFO queues are known in the art of computer programming. In a preferred embodiment, the sampled packet queue 230 stores only pointers to packets 113, or pointers to packet headers, and the original packets 113 or packet headers are stored in a memory. However, the operation of the system for adaptively sampling packets is substantially similar regardless of whether the sampled packet queue 230 holds packets 113, packet headers, pointers thereto, or some related data structure.

The sampled packet queue 230 is coupled to the adaptive sampling controller 240. The adaptive sampling controller 240 compares the length of the sampled packet queue 230 against a lower threshold 231 and an upper threshold 232. The adaptive sampling controller 240 sets the value of the control parameter N responsive to this comparison, and outputs the value of N to the sampling element 220.

In a preferred embodiment, if the length is less than the lower threshold 231, the adaptive sampling controller 240 decreases the value of the control parameter N (to sample more frequently). If the length is more than the upper threshold 232, the adaptive sampling controller 240 increases the value of the control parameter N (to sample less frequently). Methods used by the adaptive sampling controller 240 are further described with regard to FIG. 3. However, in alternative embodiments, the adaptive sampling controller 240 may set the value of N responsive to other factors, including any of the following (or some combination thereof):

the actual length of the sampled packet queue 230;

an average length of the sampled packet queue 230 for some recent time period, or some other statistical parameter for that length, such as a maximum, minimum, median, or variance thereof;

an average number of sampled packets 113 received at the sampled packet queue 230 for some recent time period, or some other statistical parameter for that number, such as a maximum, minimum, median, or variance thereof;

comparison of the actual or average length of the sampled packet queue 230, or the number of sampled packets 113 received at the sampled packet queue 230, with a further lower threshold (other than the lower threshold 231) or a further upper threshold (other than the upper threshold 232);

the presence (or absence) of a packet 113 of a selected particular type (such as a special flag packet 113, a packet 113 using a known protocol such as FTP, or a multicast packet 113) received at the sampled packet queue 230, or present in the sampled packet queue 230, for some recent time period.

In a preferred embodiment, the adaptive sampling controller 240 described herein is disposed to prevent processor overloading of the traffic management element 120, by sampling at a relatively less frequent rate when packets 113 are arriving relatively more often. However, in alternative embodiments, the adaptive sampling controller 240 may be disposed for other and further purposes, such as the following:

to obtain a more accurate count of selected particular types of packets;

to specifically respond to expected types of network traffic (such as network traffic that is expected to be relatively bursty or relatively sparse); or otherwise to adapt to either the frequency or type of packets 113 seen by the traffic management element 120.

These alternative embodiments would be clear to those skilled in the art after perusing this application, would not require undue experiment or further invention, and are within the scope and spirit of the invention.

The sampled-packet output port 250 is coupled to the head of the sampled packet queue 230. The sampled-packet output port 250 couples the sampled packets 113 to one or more packet type detectors 260.

In a preferred embodiment, there is a plurality of packet type detectors 260, one for each of the selected packet types for which a frequency measurement is desired. Each packet type detector 260 counts the number of sampled packets 113 that have the selected packet type, of all those sampled packets 113 that are received. The total number of sampled packets 113 which are received is also counted, either at each packet type detector 260 or at a "universal" packet type detector 260, which counts all sampled packets 113.

Each packet type detector 260 is coupled to a corresponding frequency measure element 270, which determines an expected frequency of the selected packet type for all packets 113 in the network traffic, in response to the actual frequency of the selected packet type for all sampled packets 113. Measurement techniques used by the frequency measure elements 270 are further described with reference to FIG. 3.

Figure 3:
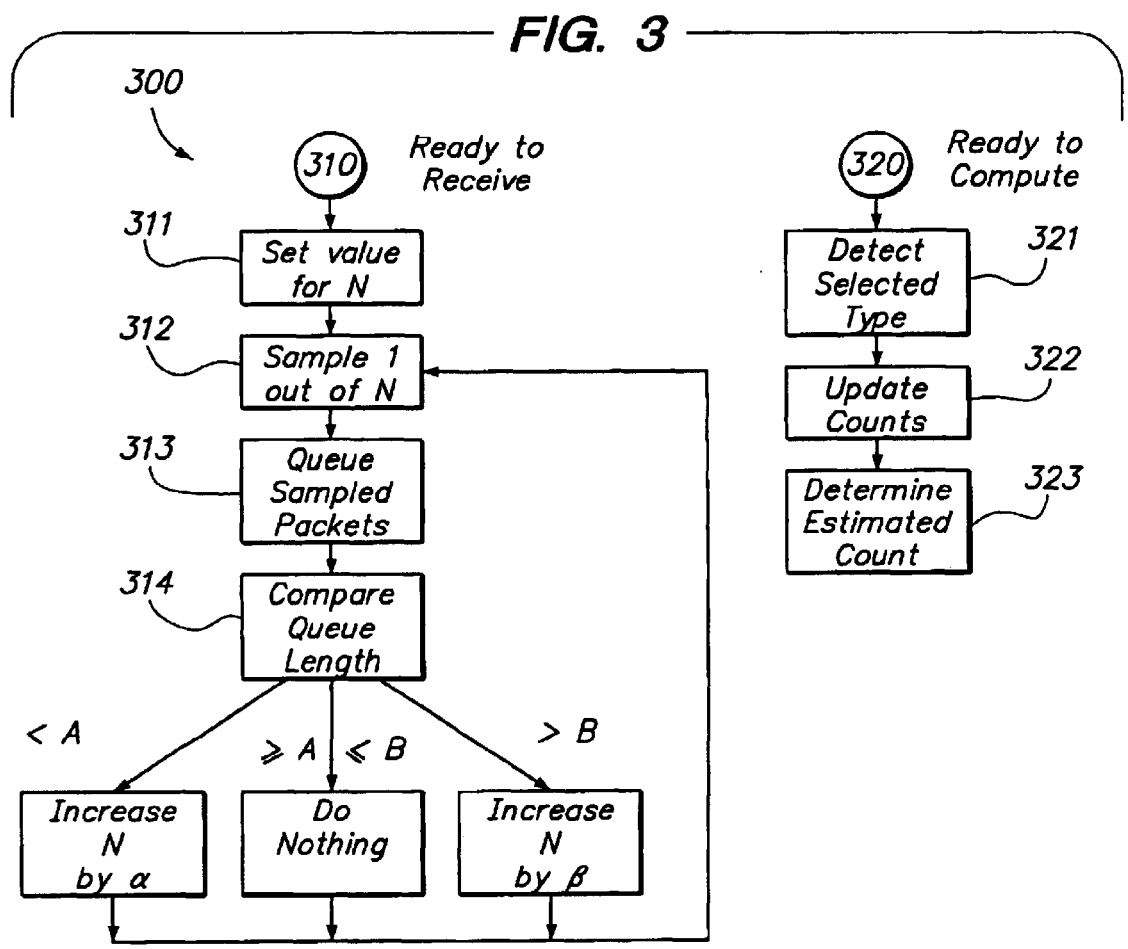
FIG. 3 shows a process flow diagram of a method for adaptively sampling packets and measuring expected frequencies for selected packet types.

FIG. 3 shows a process flow diagram of a method for adaptively sampling packets and measuring expected frequencies for selected packet types.

A method 300 for adaptively sampling packets and measuring expected frequencies for selected packet types includes a set of flow points and process steps as described herein. In a preferred embodiment, the traffic management element 120 (particularly the adaptive sampling controller 240 and the frequency measure elements 270) performs the method 300.

At a flow point 310, the traffic management element 120 is ready to receive, a sequence (or a continuation of a sequence) of packets 113.

At a step 311, the traffic management element 120 sets the control parameter N (further described with regard to FIG. 2) to a preferred value of about $N_0$, further described below, although values of N varying substantially from $N_0$ are also within the scope and spirit of the invention.

At a step 312, the traffic management element 120 receives a sequence of packets 113 and samples 1 out of N of those packets 113 using the sampling element 220 to provide a stream of sampled packets 113.

At a step 313, the traffic management element 120 queues the stream of sampled packets 113 using the sampled packet queue 230, and counts the actual number of packets of each selected type using the packet type detectors 260.

At a step 314, the traffic management element 120 compares the length of the sampled packet queue 230 with the lower threshold 231 and with the upper threshold 232. In a preferred embodiment, the lower threshold 231 is constant and substantially equals a control parameter A. The traffic management element 120 performs a step 315, a step 316, or a step 317, in response to the comparison, and continues with the step 312.

If the length is less than the lower threshold 231, the traffic management element 120 performs the step 315. At the step 315, the traffic management element 120 uses the adaptive sampling controller 240 to increase the value of the control parameter N by a factor of $\alpha$, where $\alpha$ is a control parameter. The new control parameter N is maintained for at least S new sample packets 113, where S is a control parameter.

If the length is between the lower threshold 231 and the upper threshold 232, the traffic management element 120 performs the step 316. In a preferred embodiment, the upper threshold 232 is constant and substantially equals a control parameter B. At the step 316, does not adjust the control parameter N.

If the length is more than the upper threshold 232, the traffic management element 120 performs the step 317. At the step 317, the traffic management element 120 uses the adaptive sampling controller 240 to decrease the value of the control parameter N by a factor of $\beta$, where $\beta$ is a control parameter. The new control parameter N is maintained for at least S new sample packets 113, where S is the control parameter described above.

In a preferred embodiment, the following values of the control parameters are used.

$N_0$ about 400 (as described above)
A about 15
α about 2
B about 30
β about 2
S about 10

The inventors have found by simulation that these values of the control parameters do not produce skew.

However, in alternative embodiments, substantially different values for these control parameters may be used; such alternative embodiments would not require undue experiment or further invention, and are within the scope and spirit of the invention.

At a flow point 320, the traffic management element 120 is ready to compute a frequency measure of packets 113 of a selected particular type.

In a preferred embodiment, the steps following the flow point 310 are performed in parallel with the steps following the flow point 320. Thus, operation of the sampling element 220 and the adaptive sampling controller 240 (to sample packets 113) is in parallel with operation of the packet type detectors 260 and their corresponding frequency measure elements 270 (to compute the frequency measure of packets 113 of each selected particular type).

At a step 321, the packet type detector 260 for a first selected type K detects a packet 113 of that type K.

At a step 322, the corresponding frequency measure element 270 for the first selected type K updates its counts of the estimated number of packets 113 of type K, and of the actual number of total packets 113. In a preferred embodiment, the following information is maintained:

| | |
|---|---|
| count | the estimated number of packets of type K |
| variance | the estimated variance of the count |
| i | the number of packets |
| j | the value of i for the last sampled packet of type K |
| n | the number of sampled packets |
| m | the value of n for the last sampled packet of type K |

At a step 323, the frequency measure element 270 for the first selected type K determines an estimated count (from which an average frequency can be computed) for packets 113 of the selected type K, and a variance for the estimated count of packets 113 of the selected type K, according to the following sub-steps:

At a sub-step 323(a), a temporary value $N_{temp}$ is set equal to an estimated number of packets of type K which have passed by between this sampled packet of type K and the most recent previously sampled packet of type K. In a preferred embodiment, $N_{temp}$ is set equal to $(i-j)/(n-m)$.

At a sub-step 323(b), the estimated number of packets of type K is updated. In a preferred embodiment, count is set equal to count $+N_{temp}$.

At a sub-step 323(c), the estimated variance is updated. In a preferred embodiment, if $m < (n-1)$ then variance is set equal to variance $+2 N_{temp}$.

At a sub-step 323(d), the counts j and m are updated. In a preferred embodiment, m is set equal to n, and i is set equal to j.

In a preferred embodiment, the best estimate of the count is count, and the best estimate of the 95% confidence interval is given by count ±2 sqrt (variance) where sqrt is a square root function.

Alternative Embodiments although preferred embodiments are disclosed herein, many variations are possible which remain within the concept, scope, and spirit of the invention, and these variations would become clear to those skilled in the art after perusal of this application.

What is claimed is:

1. A system including an input port for receiving network packets;
    a sampling element for selecting a fraction of those packets for review, said sampling element including a feedback element for adaptively altering said fraction;
    a queue of selected packets;
    a packet-type detector to detect packets of a particular type, said packet type detector coupled to said queue; and
    a frequency measurement element to determine an expected frequency of a particular packet type, said frequency measurement element coupled to said packet-type detector;
    wherein said feedback element is responsive to a length of said queue.

2. A system as in claim 1, wherein said feedback element is responsive to a load on said frequency measurement element.

3. A system as in claim 1, wherein said feedback element is responsive to a frequency measure determined by said frequency measurement element.

4. A system as in claim 1, wherein a default value for said fraction is selected response to a bandwidth of said input type.

5. A system as in claim 4, wherein said fraction is adaptively altered based on a presence or absence of a particular type of packet selected from among plural types of packets.

6. A method, including steps for sampling a set of packets at a network interface of a switch, said steps for sampling including steps for adaptively altering a fraction of said packets for selection;
    wherein said steps for adaptively altering a fraction of said packets for selection include steps for maintaining a queue of selected packets; and altering said fraction in response to a length of said queue and;
    wherein the method includes steps for determining a frequency of packets of a known type within said selected packets.

7. A method as in claim 6, wherein said steps for adaptively altering a fraction of said packets for selection include steps for measuring a frequency of packets of a known type within said selected packets; altering said fraction in response to a load imposed by said steps for measuring.

8. A method as in claim 6, wherein said steps for adaptively altering a fraction of said packets for selection include steps for altering said fraction in response to two or more factors responsive to said selected packets.

9. A method as in claim 6, including steps for determining an error range for said measured frequency.

10. A method as in claim 6, including steps for setting a control parameter;
    sampling said received packets in response to said control parameter, to provide a queue of sampled packets;
    comparing a length of said queue with a threshold;
    altering said control parameter in response to said threshold.

11. A method as in claim 10, wherein said control parameter is a fraction of said received packets to sampled for said queue.

12. A method as in claim 10, wherein said threshold includes at least one of: a lower bound for said length, an upper bound for said length.

13. A method as in claim 10, wherein said threshold includes a lower bound for said length and said steps for altering said control parameter operate to lengthen said queue in response to said steps for comparing.

14. A method as in claim 10, wherein said control parameter is a fraction of said received packets to sample for said queue;
said threshold includes a lower bound for said length; and
said steps for altering said control parameter decrease said control parameter in response to said steps for comparing.

15. A method as in claim 10, wherein said threshold includes an upper bound for said length and said steps for altering said control parameter operate to shorten said queue in response to said steps for comparing.

16. A method as in claim 10, wherein said control parameter is a fraction of said received packets to sample for said queue;
said threshold includes an upper bound for said length; and
said steps for altering said control parameter increase said control parameter in response to said steps for comparing.

17. A method as in claim 10, wherein said steps for altering said control parameter operate to maintain said control parameter constant for at least a selected number of sampled packets.

18. A method as in claim 10, wherein said steps for sampling do not produce skew.

19. A method as in claim 6, wherein a default value for said fraction is selected response to a bandwidth of said network interface.

20. A method as in claim 19, wherein said fraction is adaptively altered based on a presence or absence of a particular type of packet selected from among plural types of packets.

21. A system including
means for collecting aggregate information about network traffic;
means for maintaining processor load relatively constant for a processor controlling said means for collecting despite substantial variation in network traffic;
wherein said means for collecting and said means for maintaining include an input port for receiving network packets, a sampling element for selecting a fraction of those packets for review, said sampling element including a feedback element for adaptively altering said fraction, a queue of selected packets, a packet-type detector to detect packets of a particular type, said packet-type detector coupled to said queue, and a frequency measurement element to determine an expected frequency of a particular packet type, said frequency measurement element coupled to said packet-type detector; and
wherein said feedback element is responsive to a length of said queue.

22. A system as in claim 21, wherein a default value for said fraction is selected response to a bandwidth of said input port.

23. A system as in claim 22, wherein said fraction is adaptively altered based on a presence or absence of a particular type of packet selected from among plural types of packets.

24. A computer-readable medium carrying one or more instructions, wherein execution of the one or more sequences of instructions by one or more processors causes the one or more processors to perform the steps of:
sampling a set of packets at a network interface of a switch, said step for sampling including steps for adaptively altering a fraction of said packets for selection;
wherein said steps for adaptively altering a fraction of said packets for selection include steps for maintaining a queue of selected packets; and altering said fraction in response to a length of said queue; and
determining a frequency of packets of a known type within said selected packets.

25. The computer-readable medium of claim 24, wherein said steps for adaptively altering a fraction of said packets for selection include steps for measuring a frequency of packets of a known type within said selected packets; altering said fraction in response to a load imposed by said steps for measuring.

26. The computer-readable medium of claim 24, wherein said steps for adaptively altering a fraction of said packets for selection include steps for altering said fraction in response to two or more factors responsive to said selected packets.

27. The computer-readable medium of claim 24, wherein the computer-readable medium further includes sequences of instructions for performing steps for determining an error range for said measured frequency.

28. The computer-readable medium of claim 24, wherein the computer-readable medium further includes sequences of instructions for performing steps for setting a control parameter;
sampling said received packets in response to said control parameter, to provide a queue of sampled packets;
comparing a length of said queue with a threshold;
altering said control parameter in response to said threshold.

29. The computer-readable medium of claim 28, wherein said control parameter is a fraction of said received packets to sampled for said queue.

30. The computer-readable medium of claim 28, wherein said threshold includes at least one of: a lower bound for said length, an upper bound for said length.

31. The computer-readable medium of claim 28, wherein said threshold includes a lower bound for said length and said steps for altering said control parameter operate to lengthen said queue in response to said steps for comparing.

32. The computer-readable medium of claim 28, wherein said control parameter is a fraction of said received packets to sample for said queue;
said threshold includes a lower bound for said length; and
said steps for altering said control parameter decrease said control parameter in response to said steps for comparing.

33. The computer-readable medium of claim 28, wherein said threshold includes an upper bound for said length and said steps for altering said control parameter operate to shorten said queue in response to said steps for comparing.

34. The computer-readable medium of claim 28, wherein said control parameter is a fraction of said received packets to sample for said queue;
said threshold includes an upper bound for said length; and said steps for altering said control parameter increase said control parameter in response to said steps for comparing.

35. The computer-readable medium of claim 28, wherein said steps for altering said control parameter operate to maintain said control parameter constant for at least a selected number of sampled packets.

36. A computer-readable medium as recited in claim 28, wherein said steps for sampling do not produce skew.

37. A computer-readable medium as recited in claim 24, wherein a default value for said fraction is selected response to a bandwidth of said network interface.

38. A computer-readable medium as recited in claim 37, wherein said fraction is adaptively altered based on a presence or absence of a particular type of packet selected from among plural types of packets.

* * * * *